(12) United States Patent
Sol

(10) Patent No.: US 11,330,772 B2
(45) Date of Patent: May 17, 2022

(54) AUTONOMOUS IRRIGATION SYSTEM

(71) Applicant: SOLIDRIP LTD., Tel Aviv (IL)

(72) Inventor: David Sol, Kibbutz Naan (IL)

(73) Assignee: SOLIDRIP LTD., Tel Aviv (IL)

( * ) Notice: Subject to any disclaimer, the term of this patent is extended or adjusted under 35 U.S.C. 154(b) by 109 days.

(21) Appl. No.: 16/643,669

(22) PCT Filed: Sep. 6, 2018

(86) PCT No.: PCT/IL2018/051011
§ 371 (c)(1),
(2) Date: Mar. 2, 2020

(87) PCT Pub. No.: WO2019/049149
PCT Pub. Date: Mar. 14, 2019

(65) Prior Publication Data
US 2020/0267916 A1 Aug. 27, 2020

Related U.S. Application Data

(60) Provisional application No. 62/554,610, filed on Sep. 6, 2017.

(51) Int. Cl.
*A01G 27/04* (2006.01)
*A01G 27/00* (2006.01)
(Continued)

(52) U.S. Cl.
CPC ......... *A01G 27/003* (2013.01); *A01G 25/167* (2013.01); *A01G 27/001* (2013.01);
(Continued)

(58) Field of Classification Search
CPC ...... A01G 25/02; A01G 25/023; A01G 25/06; A01G 25/167; A01G 27/001; A01G 27/003; A01G 27/04; A01G 29/00
See application file for complete search history.

(56) References Cited

U.S. PATENT DOCUMENTS

| 3,273,849 A | 9/1966 | Henning |
| 3,426,539 A | 2/1969 | Whear |

(Continued)

FOREIGN PATENT DOCUMENTS

| CN | 1086377 A | 5/1994 |
| CN | 2696308 Y | 5/2005 |

(Continued)

OTHER PUBLICATIONS

PCT Search Report for International Application No. PCT/IL2018/05101; mailed ; 4 pp.

(Continued)

*Primary Examiner* — Lisa L Tsang
(74) *Attorney, Agent, or Firm* — The Roy Gross Law Firm, LLC; Roy Gross

(57) ABSTRACT

A system, comprising: a housing comprising an elongated hollow body configured to be at least partially embedded in a soil environment adjacent a plant at a desired depth; a swellable element dimensioned to be disposed within the housing, the swellable element being configured to swell when absorbing moisture; a resiliently-compressible flexible tube configured to provide water to the soil environment, the flexible tube is laced transversely through tube openings of the housing, the flexible tube is disposed adjacent to the swellable element inside the housing such that a swelling or displacement of the swellable element compresses the flexible tube, thereby limiting or preventing water flow therethrough; and a moisture transfer adapter configured to communicate moisture along its length from a desired location within the soil environment to the swellable element, as well as methods of using the system.

17 Claims, 11 Drawing Sheets

(51) Int. Cl.
*A01G 29/00* (2006.01)
*A01G 25/16* (2006.01)
*G01N 19/10* (2006.01)

(52) U.S. Cl.
CPC .......... *A01G 27/006* (2013.01); *A01G 27/04* (2013.01); *A01G 29/00* (2013.01); *G01N 19/10* (2013.01)

(56) References Cited

U.S. PATENT DOCUMENTS

| | | | |
|---|---|---|---|
| 3,512,712 A * | 5/1970 | Benesch | A01G 25/167 |
| | | | 239/63 |
| 3,874,590 A | 4/1975 | Gibson | |
| 3,898,843 A | 8/1975 | Waterston | |
| 4,095,458 A | 6/1978 | Wild | |
| 4,121,608 A | 10/1978 | MacLeod | |
| 4,182,357 A | 1/1980 | Ornstein | |
| 4,214,701 A | 7/1980 | Beckmann | |
| 4,696,319 A * | 9/1987 | Gant | A01G 25/167 |
| | | | 137/78.3 |
| 4,739,789 A | 4/1988 | Hamilton | |
| 5,996,279 A * | 12/1999 | Zayeratabat | A01G 29/00 |
| | | | 47/48.5 |
| 6,220,268 B1 | 4/2001 | Bolton | |
| 6,782,909 B1 * | 8/2004 | Ragless | G01N 13/04 |
| | | | 137/78.3 |
| 7,506,658 B2 | 3/2009 | Guest et al. | |
| 8,065,832 B2 * | 11/2011 | King | A01G 29/00 |
| | | | 47/48.5 |
| 8,371,325 B1 | 2/2013 | Grizzle | |
| 8,979,431 B2 | 3/2015 | Bayley | |
| 2002/0124880 A1 | 9/2002 | Tanikawa | |
| 2004/0139650 A1 * | 7/2004 | Haq | A01G 27/003 |
| | | | 47/48.5 |
| 2005/0087231 A1 | 4/2005 | Sanders et al. | |
| 2016/0088808 A1 * | 3/2016 | Sheets | B05B 15/40 |
| | | | 239/63 |

FOREIGN PATENT DOCUMENTS

| | | | |
|---|---|---|---|
| DE | 2739650 B1 | 3/1979 | |
| DE | 3207992 C1 * | 10/1983 | ........ A01G 27/003 |
| FR | 2657139 A1 | 7/1991 | |
| FR | 2694157 A1 | 2/1994 | |
| FR | 2735327 A1 | 12/1996 | |
| WO | 2017083673 A1 | 5/2017 | |

OTHER PUBLICATIONS

PCT Written Opinion for International Application No. PCT/IL2018/05101; mailed ; 6 pp.
PCT Preliminary Report for International Application No. PCT/IL2018/05101; dated ; 7 pp.

* cited by examiner

AUTONOMOUS IRRIGATION SYSTEM

CROSS REFERENCE TO RELATED APPLICATIONS

This application is a National Phase of PCT Patent Application No. PCT/IL2018/051011 having International filing date of Sep. 6, 2018, which claims the benefit of priority of U.S. Provisional Patent Application No. 62/554,610, filed Sep. 6, 2017. the contents of the above applications are all incorporated by reference as if fully set forth herein in in their entirety.

FIELD OF THE INVENTION

The invention relates to the field of autonomous plant irrigation.

BACKGROUND OF THE INVENTION

Various types of plants have different irrigation requirements depending on numerous factors, such as type of plant, rate of growth, relative humidity, and rate of air flow around the leaves. Additionally, environmental factors such as temperature, humidity, terrain or soil type, gravitational seepage, etc., may also affect the irrigation requirements of the various plants. Insufficient watering may result in a plant drying up and withering away. Conversely, excessive watering may also be detrimental to the plant and its root system.

The cultivation of healthy plants requires individual attention to the specific needs of different plants. This chore may be onerous and may lead to excessive or insufficient watering to the detriment of the plants. The use of a "one-size-fits-all" irrigation systems, where plants arranged along the same irrigation line receive the same quantity of water at the same time, poses a similar threat of excessive or insufficient watering. However, customized irrigation systems may be expensive, time consuming, require electricity and be intricate to operate. Further, due to the increased evaporation of water near the surface of soil, irrigation systems that sense moisture near where they are implanted and not at the base of the plants roots, may inadvertently overwater the plant. An automated, non-electronic, irrigation system that releases water based on the water content at the base of a plants roots is thus greatly needed.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

According to a first aspect, there is disclosed a system, comprising: a housing comprising an elongated hollow body configured to be at least partially embedded in a soil environment adjacent to a plant at a desired depth; a swellable element dimensioned to be disposed within the housing, the swellable element being configured to swell when absorbing moisture; a resiliently-compressible flexible tube configured to provide water to the soil environment, the flexible tube is laced transversely through tube openings of the housing, the flexible tube is disposed adjacent to the swellable element inside the housing such that a swelling or displacement of the swellable element compresses the flexible tube, thereby limiting or preventing water flow therethrough; and a moisture transfer adapter configured to communicate moisture along its length from a desired location within the soil environment to the swellable element According to another aspect, there is disclosed a method comprising: providing a system of the invention; at least partially embedding the housing in a soil environment at a predetermined depth adjacent to a plant; configuring the flexible tube to deliver water to a region of the soil environment below the plant; configuring a location of the moisture transfer adapter so as to provide moisture communication from the region of the soil environment below the plant to the swellable element; and flowing water through the flexible tube.

In some embodiments, the system of the invention further comprises an irrigation plate disposed underneath the roots of a plant within the soil environment, the irrigation plate being configured to receive and retain water from the flexible tube and irrigate the soil environment. In some embodiments, the desired location is the irrigation plate. In some embodiments, the irrigation plate comprises a connector for stably attaching the transfer adapter thereto. In some embodiments, the irrigation plate is a bottom portion of a container configured to contain a plant to be irrigated.

In some embodiments, the housing comprises exposure windows configured to provide air and water communication between the swellable element and the ambient environment outside the housing. In some embodiments, the windows provide communication between the swellable element and the air above ground. In some embodiments, the housing is configured to be imbedded in the soil and partially above ground. In some embodiments, the swellable element is at least partially above ground. In some embodiments, the swellable element is completely above ground.

In some embodiments, exposure to ambient air causes water to evaporate from the swellable element. In some embodiments, egression of moisture from the swellable element reduces a constricting force applied on the flexible tube by the swellable element, the reduction of the constricting force enabling water to flow through the flexible tube.

In some embodiments, the housing further comprises a regulating element comprising a screw configured to rotatably engage with interior screw threads at an open end of the housing, the regulating element being disposed within the housing such that by rotating the regulating element, the water-swellable element is displaced towards the flexible tube such that it applies a compressive force on the flexible tube.

In some embodiments, the flexible tube comprises a catch valve configured to prevent debris in the soil environment from penetrating the flexible tube.

In some embodiments, the moisture transfer adapter is made of a fibrous or a porous material. In some embodiments, the moisture transfer adapter comprises a sleeve configured to wrap around a portion of the exterior of the housing comprising at least a portion of the exposure windows. In some embodiment, the moisture transfer adapter is configured to communicate moisture from the irrigation plate to the swellable element at substantially a same rate that moisture is transferred through the soil environment.

In some embodiments, the system of the invention further comprises a filter defining a perforated elongated tubular body configured for receiving the moisture transfer adapter therein.

In some embodiments, the system of the invention further comprises a rigid element coupled to the swellable element and configured to communicate compressive pressure from the swellable element to the flexible tube upon swelling or displacement of the swellable element.

In some embodiments, the system of the invention further comprises a non-water permeable adapter cover positioned to block transfer of moisture to at least a portion of the adapter.

In some embodiments, the system of the invention does not comprise an electronic component.

In some embodiments, the method of the invention further comprises placing an irrigation plate in the region of the soil environment below the plant such that the flexible tube delivers water to the irrigation plate and the adapter provides moisture communication from the irrigation plate to the swellable element.

In some embodiments, the egression of moisture from the swellable element reduces a constricting force applied on the flexible tube by the swellable element, the reduction of the constricting force enabling water flow through the flexible tube.

In some embodiments, the moisture transfer adapter is configured to communicate moisture from the region of the soil environment below the plant to the swellable element at substantially the same or a greater rate than moisture is transferred through the soil environment.

In some embodiments, the method of the invention is for automatically and non-electronically controlling irrigating of the plant.

In some embodiments, the region of the soil environment below the plant is at least 10 cm from the swellable element.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
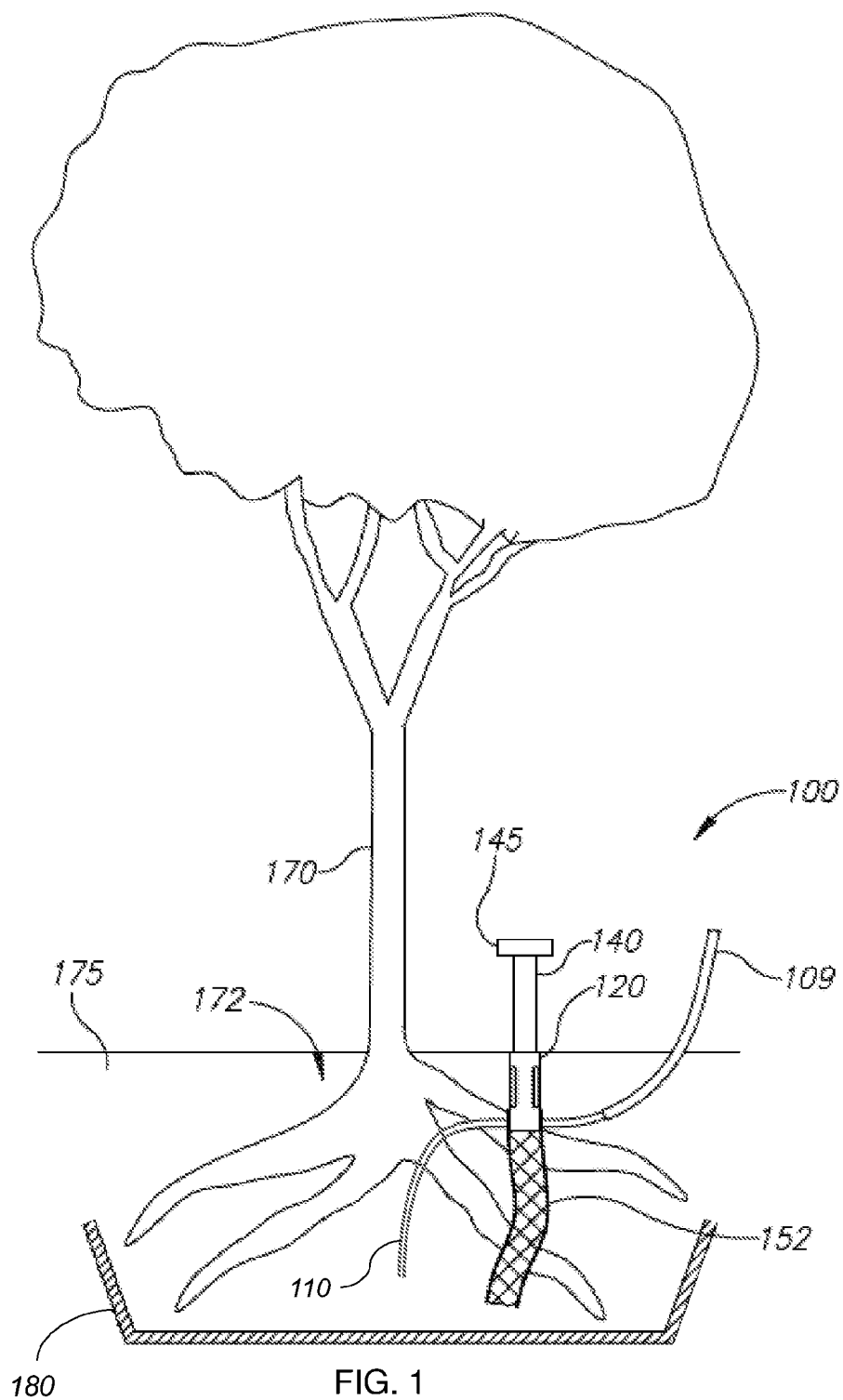
FIG. 1 shows an autonomous irrigation system used in plant irrigation, according to certain embodiments.

Disclosed herein is an autonomous, non-electronic, irrigation system for regulating the irrigation of a plant embedded in a soil environment. In some embodiments, the irrigation system is self-controlled. In an exemplary embodiment, the autonomous irrigation system comprises a housing; a flexible tube passing through the housing and configured to provide irrigation to the plant; a swellable element disposed within the housing adjacent the irrigation tube and configured to swell from moisture absorption and to shrink on egression of moisture; and a moisture transfer adapter for communicating moisture levels in a desired location to the swellable element. The autonomous irrigation system is designed to be at least partially embedded in the soil adjacent to the roots of the plant. The housing may be partially or fully embedded in the soil environment, so as to enable the swellable element to be exposed to a moisture level that reflects the moisture level in the soil environment. The housing may also be embedded such that the swellable element is partially exposed to atmospheric air, to enable the swellable element to egress moisture into the air in a similar manner to the soil environment.

Upon absorption of moisture from the surrounding soil environment, the swellable element swells and applies a compressive force onto the flexible tube, thereby restricting or completely stopping the flow of water through the flexible tube. When the water in the swellable element egresses, for example, through evaporation or absorption by the soil environment, the swellable element shrinks, thus reducing the compressive force applied to the flexible tube and enabling water to flow through the flexible tube at an increased rate. The autonomous irrigation system may be configured such that the normal flow rate through the flexible tube is sufficient to prevent clogging of the flexible tube. In certain embodiments, the flexible tube may comprise a check valve, which may be configured to prevent insects, soil, or debris from entering the flexible tube and potentially clogging or damaging the flexible tube. In certain embodiments, an opening of the flexible tube through which water pours out of the flexible tube may be located at a predetermined distance from the swellable element, to provide sufficient moisture levels in the soil environment prior to the swellable element swelling and compressing the flexible tube.

Optionally, the autonomous irrigation system comprises a bias screw, which is configured to control an initial maximum rate of water flow through the flexible tube. Tightening the bias screw applies an initial compressive force to the swellable element, which in turn compresses the flexible tube, thereby limiting the maximum flow rate through the flexible tube. Conversely, loosening the bias screw reduces the constant force applied to the flexible tube through the swellable element, thus increasing the maximum flow rate up to the full flow rate of the flexible tube.

In certain embodiments, the flexible tube may irrigate the soil environment from a surface of the soil environment, such that the water seeps through the soil environment. In other embodiments, the system may comprise an irrigation plate or mat disposed underneath a plant pot or forming an integral part thereof; or embedded in the soil underneath the roots of the plant. The irrigation plate is configured to receive and retain a desired amount of irrigation, which is then absorbed and controllably disperses upwards through the soil environment. Moisture may be absorbed into the soil environment from the irrigation plate through, e.g., osmotic transference. The moisture dispersed through the soil environment and reaches the roots, thus providing the necessary water for the plant. The irrigation plate may disperse the water over a larger surface area thereby ensuring consistent optimal moisture levels throughout the soil environment. Irrigation using the irrigation plate may also reduce the mineral content or salinity of the water that reaches the roots, as only the water is absorbed by the soil environment, while any mineral content remains as residue in the irrigation plate.

In some embodiments, the autonomous irrigation system is non-electronic. In some embodiments, the irrigation system operates entirely mechanically. In some embodiments, the autonomous irrigation system is configured to be completely embedded in soil. In some embodiments, the autonomous irrigation system is configured to be partially embedded in soil. In some embodiments, the autonomous irrigation system is configured to be partially embedded in soil such that the swellable element contacts the air.

In certain embodiments, the autonomous irrigation system further comprises a moisture transfer adapter configured to communicate moisture levels to the swellable element from a predetermined location that is not in the immediate vicinity of the autonomous irrigation system, e.g., from the irrigation plate. Communication of moisture levels through the moisture transfer adapter may be performed through osmotic transference towards the swellable element. The moisture transfer adapter may define a predetermined distance between the swellable element and a location at which the flexible tube provides water for irrigation, e.g., at the irrigation plate. The swellable element may be arranged at a predetermined height above the irrigation plate, such that when a predetermined volume of water fills the irrigation plate, the swellable element communicates such moisture level to the swellable element. Alternatively, the moisture transfer adapter may be coupled to the irrigation plate. Thus, once a desired volume of water is provided to the irrigation plate, the moisture level is communicated to the swellable element via the moisture transfer adapter. This enables the autonomous irrigation system to respond more effectively by restricting or stopping further irrigation once the irrigation plate has received a sufficient supply of water.

Herein throughout, the term "swellable", or any grammatical inflection thereof, as used herein, intends the property of the material to absorb a fluid medium, typically, but not exclusively, aqueous, with an accompanying increase in the volume of such material. In some embodiments, swellable is also shrinkable. In some embodiments, swellable is able to change volume in response to the absorbance or loss of moisture.

In some embodiments, under conditions known in the art, the swellable material has the ability to swell by a volume of at least 0.1, 0.2, 0.25, 0.3, 0.4, 0.5, 0.6, 0.7, 0.75, 0.8, 0.9, 1, 1.25, 1.5, 1.75, 2, 2.5, 3, 3.5, 4, 4.5 or 5 ml, upon immersing thereof in 100 grams of water. Each possibility represents a separate embodiment of the invention. In some embodiments, under conditions known in the art, the swellable material has the ability to swell by a volume of between 0.1-5.0, 0.1-3, 0.1-1, 0.1-0.75, 0.1-0.5, 0.25-5, 0.2-3, 0.25-1, 0.25-0.5, 0.5-5, 0.5-3, 0.5-1, 1-5, or 1-3 ml, upon immersing thereof in 100 grams of water. Each possibility represents a separate embodiment of the invention. In some embodiments, the swellable material has the ability to swell by at least 10, 15, 20, 25, 30, 35, 40, 45, 50, 55, 60, 65, 70, 75, 80, 85, 90, 95, 100% of its volume upon immersion in water. Each possibility represents a separate embodiment of the invention.

In some embodiments, the swelling is at least 70%, at least 75%, at least 80%, at least 85%, at least 90%, at least 95%, or in some embodiments, even completely reversible, upon the release of the fluid medium from the swellable material. In some embodiments, the swelling is 100% reversible. In some embodiments, the swellable element is a reversibly swellable element, configured to swell when absorbing moisture and to shrink when losing moisture. In some embodiments, loss of moisture is due to evaporation, drying and/or diffusion. In some embodiments, the tube is disposed adjacent to the swellable element inside the housing such that a shrinking of a swelled swellable element releases the flexible tube, thereby unrestricting water flow therethrough. Optionally, the fluid medium may be released from the swellable material by evaporation or drying.

The swellable element may be made of any material that changes volume due to intake or egress of moisture from the element. Such swellable materials are well known in the art and any such element may be used, including but not limited to, hydrogels, clays, slurries, rubber and the like. In some embodiments, the swellable material comprises rubber. In some embodiment, the rubber is natural rubber. In some embodiments, the rubber is vulcanized rubber. In some embodiments, the rubber is artificial rubber. In some embodiments, the artificial rubber is chemically combined with a hydrophilic material or compound. In some embodiments, the swellable element comprises a hydrophilic material. In some embodiments, the swellable element comprises a material capable of changing volume and a hydrophilic material. In some embodiments, the swellable element is capable of changing volume in response to moisture intake or egress. In certain embodiments, the swellable element may be made of various forms of silicate minerals such as, and without being limited thereto, bentonite clay. The swellable element may have varying levels of hydrophilic and solvating properties. Without being bound by any particular theory, the swelling of bentonite may occur due to water absorption at a platelet surface level and/or by osmotic repulsive forces, forcing platelets to detach and spread out. In some types of bentonite, such as sodium bentonite with sodium cation prevalence ($Na^+$), water may penetrate through platelets, forcing platelets apart, thus leading to swelling. Conversely, calcium bentonite with calcium cation prevalence ($Ca^{2+}$) may have low absorption properties due to a strong positive charge preventing water from penetrating through the platelets. Thus, in calcium bentonite with calcium cation prevalence platelets are more likely to flake off rather than swell.

When bentonite is dispersed in water, highly stable colloidal suspensions may be formed with high viscosity and thixotropy. At high enough concentrations of bentonite, such suspensions may to take on gel characteristics. Suspensions may form when water-molecules penetrate platelet interlayers. Hydrogen bridge bonds may be formed by the hydrogen atoms contained in water molecules. Platelets become isolated from each other, while bonded through interposition of water. When left still, the bentonite may form a mesh by incorporating water, causing the bentonite to jellify. Conversely, under mechanical stress, these bonds may partially break, thus allowing platelets to move more freely. Viscosity under these conditions is lower than at rest. Bentonite may consist of a varying density when dry, e.g. within a range of 2.2 grams/centimeter cubed (g/cm3) to 2.8 g/cm3. Milled bentonite may have an apparent density that may vary depending on mill fineness, ranging from 0.7 g/cm$^3$ to 0.9 g/cm$^3$.

FIG. 1 illustrates a plant irrigation arrangement utilizing an autonomous irrigation system 100, according to certain embodiments. Plant 170 comprises roots 172, which may be embedded in a soil environment 175. An irrigation plate 180 is disposed substantially beneath the roots 172 and is supplied with water for irrigating tree 170. As moisture is absorbed by soil environment 175 from irrigation plate 180, water saturation of the soil increases and disperses upwards through the soil environment 175, until it reaches the autonomous irrigation system 100. In certain embodiments, irrigation plate 180 may enable osmotic transference of moisture through soil environment 175 to roots 172 to provide plant 170 with the necessary water intake, without salts or minerals present in the water, which may be harmful to a plant's longevity. In certain embodiments, the surface area of irrigation plate 180 may be dimensioned according to the size of roots 172 to ensure moisturizing of soil environment 175 adjacent to roots 172.

Irrigation plate 180 need not be inserted into the ground, but rather may be the bottom of a pot such as is used for potting plants. Indeed, irrigation plate 180 can be any water storing material or mechanism that stops water runoff. Irrigation plate 180 may be any water storage container that keeps the water deposited by system 100 from continuing down due to gravity, and rather allows for upward flow of the water through soil environment 175. Thus, irrigation plate 180 may be any container, tray, pot, nylon sheet, garden bed box, planter, or vessel that is below roots 172. Irrigation plate 180 may even be a non-dirt layer that is below soil environment 175. Many gardens, and parks are built over a layer of non-dirt construction material such as concrete or asphalt. In such cases this layer acts as the irrigation plate as it keeps water from continuing down and away from the roots via gravity.

Autonomous irrigation system 100 comprises a housing 120, bias screw 140 and bias screw handle 145. Bias screw 140 and handle 145 may be optional. Autonomous irrigation system 100 may be embedded in soil environment 175 adjacent to roots 172 at a predetermined depth. For example, autonomous irrigation system 100 may be embedded adjacent to plant 170 within a range of 1-5 centimeters (cm) of depth. In certain embodiments, housing 120 may be embedded in a predetermined depth into soil environment 175, such that the swellable element is exposed to a moisture level which reflects the moisture level of soil environment 175. In some embodiments, housing 120 is partially embedded at a predetermined depth in soil environment 175, such that the swellable element is at least partially above ground. In some embodiments, housing 120 is partially embedded at a predetermined depth in soil environment 175, such that the swellable element is in contact with the air. The predetermined depth may also provide the swelling element with sufficient exposure to ambient air to facilitate the necessary rate of water egression to simulate the rate of moisture egression from soil environment 175. The predetermined depth may vary according to soil hydraulic properties of soil environment 175 and and/or a plant water intake rate. For example, where plant 170 is a tropical plant that requires frequent irrigation, housing 120 may be embedded such that the swellable element has a reduced exposure to soil environment 170 and greater exposure to atmospheric air. Where plant 170 may be of a desert or water-retaining variety, e.g., cacti or succulents, housing 120 may be embedded deeper, to provide a reduced exposure to atmospheric air, thus simulating a slower rate of egression of water from the swellable element. Thus, housing 120 and the swellable element may be placed in a position best able to mimic the water dynamics of the plant 170 it is irrigating.

Autonomous irrigation system 100 further comprises a flexible tube 110 passing through housing 120 and configured to flow water from a main irrigation tube 109 to soil environment 175, or directly to irrigation plate 180. In certain embodiments, flexible tube 110 may be composed of silicone, e.g. silicone rubber, to withstand the water pressure and to prevent the walls of flexible tube 110 from adhering together when a compressive force is applied to flexible tube 110. In certain embodiments, flexible tube 110 may comprise an external diameter within a range of 3-5 millimeter (mm) and an internal diameter within a range of 1-3 mm.

In some embodiments, flexible tube 110 is configured to deposit water directly into plate 180. In some embodiments, flexible tube 110 is configured to deposit water proximal to plate 180. In some embodiments, proximal comprises within a distance of not more than 1, 2, 3, 5, 7, 10, 15 or 20 cm from a location. Each possibility represents a separate embodiment of the invention. In some embodiments, flexible tube 110 is configured to deposit water proximal to roots 172. In some embodiments, flexible tube 110 is configured to deposit water proximal to an end of roots 172. In some embodiments, flexible tube 110 is configured to deposit water proximal to the deepest end of roots 172. As water will begin to diffuse up from irrigation plate 180, and from the end of flexible tube 110, a skilled artisan will appreciate that both of these components can be ideally places at the bottom of the root structure of plant 170. In some embodiments, plate 180 is proximal to roots 172. In some embodiments, plate 180 is proximal to an end of roots 172. In some embodiments, plate 180 is proximal to the deepest end of roots 172. In some embodiments, the end of the tube is not proximal to the housing element and/or the swellable element. In some embodiments, the end of the tube is at least 2, 3, 4, 5, 7, 10, 15, 20, 25 or 30 cm distance from the housing element or swellable element. Each possibility represents a separate embodiment of the invention.

In some embodiments, system 100 senses moisture at plate 180, at the outlet of flexible tube 110 or at the deepest end of roots 172. In some embodiments, system 100 responds to moisture at plate 180, at the outlet of flexible tube 110 or at the deepest end of roots 172. In some embodiments, system 100 irrigates in response to lack of moisture at plate 180, at the outlet of flexible tube 110 and/or at the deepest end of roots 172. In some embodiments, system 100 irrigates and/or stops irrigation in response to moisture at plate 180, at the outlet of flexible tube 110 and/or at the deepest end of roots 172. As system 100 is non-electronic the term "senses" refers to systems responding to moisture levels by releasing more water and/or slowing/stopping the release of water.

Autonomous irrigation system 100 further comprises a swellable element (not shown) housed within housing 120. The swellable element is exposed directly or indirectly to the moisture carried by the soil environment 175. In some embodiments, the swellable element is exposed to the moisture in soil 175 surrounding the autonomous irrigation system 100. In some embodiments, the swellable element is exposed to the moisture in soil 175 that is not proximal to the autonomous irrigation system 100. In some embodiments, the swellable element is exposed to the moisture in soil 175 that is at or proximal to plate 180, the outlet of flexible tube 110, or at the deepest end of roots 172. Autonomous irrigation system 100 further comprises a moisture transfer adapter 152. Transfer adapter 152 transfers moisture from a more distance location in soil 175 to the swellable element. This more distance location may optionally be at or proximal to plate 180, the outlet of flexible tube 110, and/or at the deepest end of roots 172. Transfer adapter 152 may be configured to communicate to the swellable element moisture levels from a location other than the immediate soil environment vicinity of the autonomous irrigation system 100. Thus, moisture transfer adapter 152 may provide the swellable element, e.g., with an indication of the moisture level at a different level of soil 175 or at the irrigation plate 180. By employing moisture transfer element 152, the autonomous irrigation system 100 may be embedded near surface level but configured to react to changes in moisture levels at a desired depth within the soil environment 175 or the irrigation plate 180, to provide a more efficient control over irrigation of the plant 170. In some embodiments, transfer adapter 152 allows for sensing at a distal location.

Figure 2:
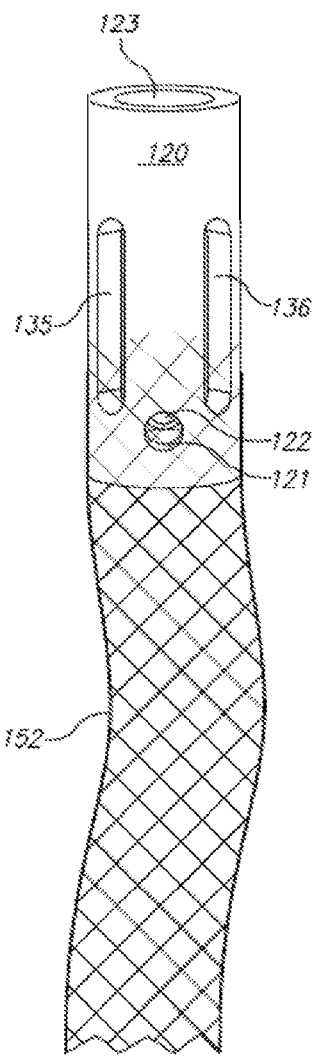
FIG. 2 shows a housing of an autonomous irrigation system, according to certain embodiments.

FIG. 2 illustrates housing 120 with moisture transfer adapter 152. Housing 120 comprises an elongate body having an optional opening 123 on one end and defining a hollow cavity therein. Optionally, housing 120 defines a cylinder having an internal diameter of between 8 mm and 12 mm and an external diameter of between 12 mm and 16 mm. Optionally, housing 120 has a length of between 30 mm and 40 mm. Optionally, housing 120 may be composed of an acrylic polymer, e.g. methacrylate, poly(methyl methacrylate), methyl acrylate, ethyl acrylate, or the like. Housing 120 may comprise exposure windows 135, 136 which may be configured to expose internal components disposed within the hollow cavity of housing 120 to an environment, e.g., soil environment 175 or atmospheric air. Optionally, exposure windows 135, 136 may have a height within a range of 17 mm to 21 mm, and a width within a range of 0.5 mm to 3.5 mm. Housing 120 may comprise tube openings 121, 122. Tube openings 121, 122 may be arranged on opposite sides to enable passing of flexible tube 110 transversely through housing 120. Tube openings 121, 122 may have a diameter within a range of 3 mm to 6 mm, to permit the passage of flexible tube 110 therethrough. Optionally, housing 120 comprises exposure apertures (not shown) configured to provide additional exposure of the internal components stored within the cavity of housing 120 to the environment. Optionally, the exposure apertures are smaller than the exposure windows 135, 136.

In certain embodiments, moisture transfer adapter 152 may be configured as a sleeve that fits around housing 120 such that it fully or partially covers exposure windows 135, 136 and any exposure apertures. Moisture transfer adapter 152 may be made of a woven element, such as a sleeve or a rope made of fibers having desired wicking properties, such as manila hemp, hemp, cotton, polypropylene, polyester, aramid, or the like. In some embodiments, moisture transfer adapter 152 may be composed of a porous material, e.g. a sponge composed of polypropylene, polyether, polyester, cellulose, or the like. In certain embodiments, the moisture transfer adapter 152 is configured to mimic the moisture transfer characteristics of soil environment 175, such that moisture transfer adapter 152 transfers moisture at the same rate as moisture is being dispersed within soil environment 175. Thus, moisture transfer adapter ensures that moisture levels by the swellable element reflect moisture levels at a desired location within the soil environment 175 or at the irrigation plate 180. Optionally, moisture transfer adapter 152 has a width or diameter within a range of 10 mm to 25 mm and a length of within a range of 3 cm and 10 cm.

In some embodiments, the moisture transfer adapter transfers water by capillary action. In some embodiments, the moisture transfer adapter comprises an absorbent material of a resilience that can hold absorbed water. In some embodiments, the moisture transfer adapter is a wick, cord, rope or the like, comprising strands of absorbent material. In some embodiments, the moisture transfer adapter is an artificial root. In some embodiments, the adapter mimics the capillary water transfer of a root. In some embodiments, the adapter comprises a rate of capillary action that is equal to or great than that of soil. In some embodiments, the adapter comprises a rate of capillary action that is great than that of soil. Non-limiting examples of material that can transfer moisture through soil and function as the adapter include, plastics and synthetics such as polymers (polypropylene, polyether, polyester and the like), nylon and polyester and natural materials such as cellulose, cotton and other fabrics. In some embodiments, the adapter is made of a polymer. In some embodiments, the adapter is made of plastic. In some embodiments, the adapter is a mesh of fibers.

Figure 3A:
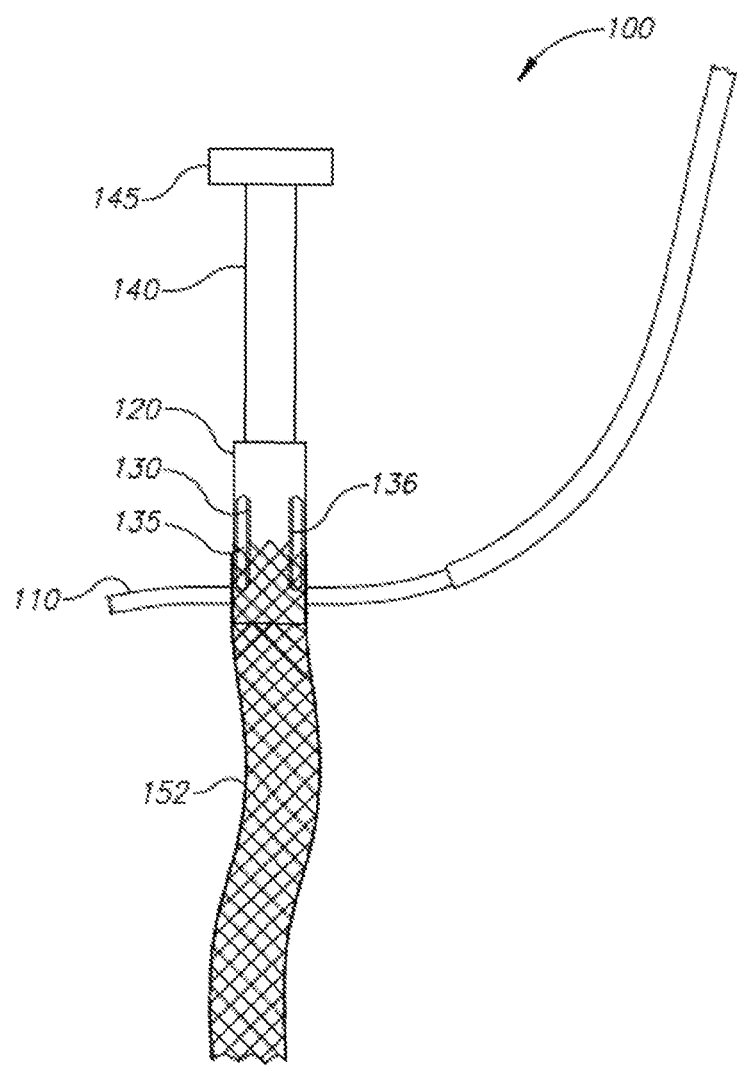
FIGS. 3A-3C show an autonomous irrigation system, according to certain embodiments.
Figure 3B:
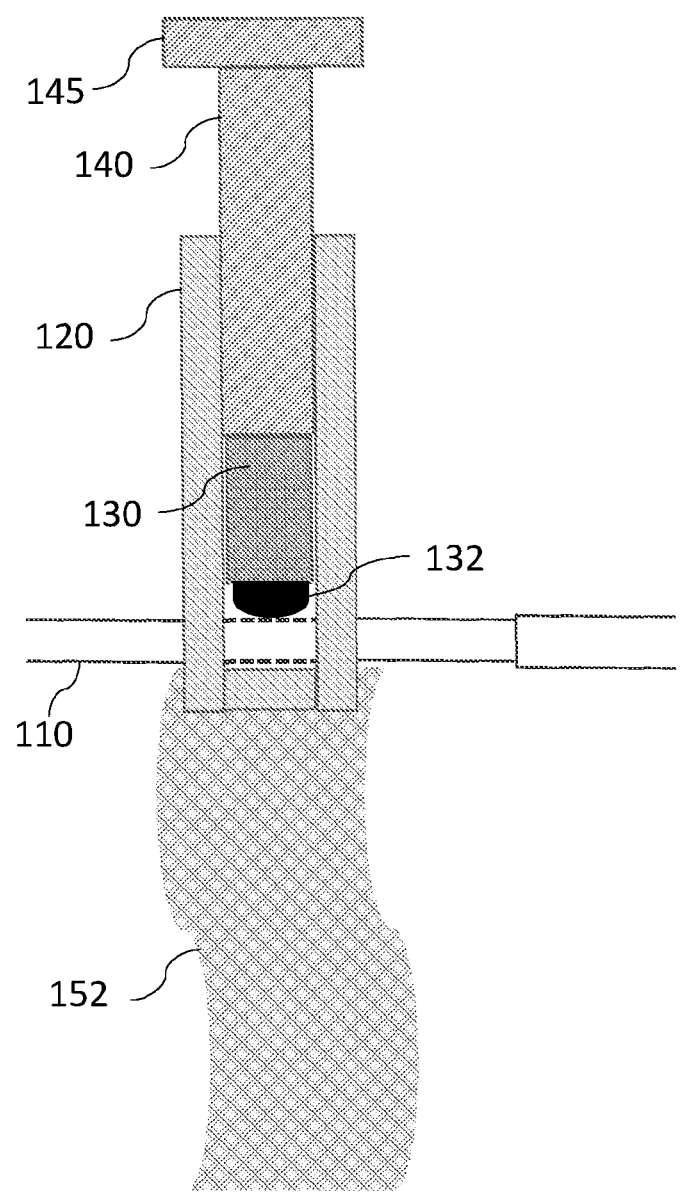
Figure 3C:
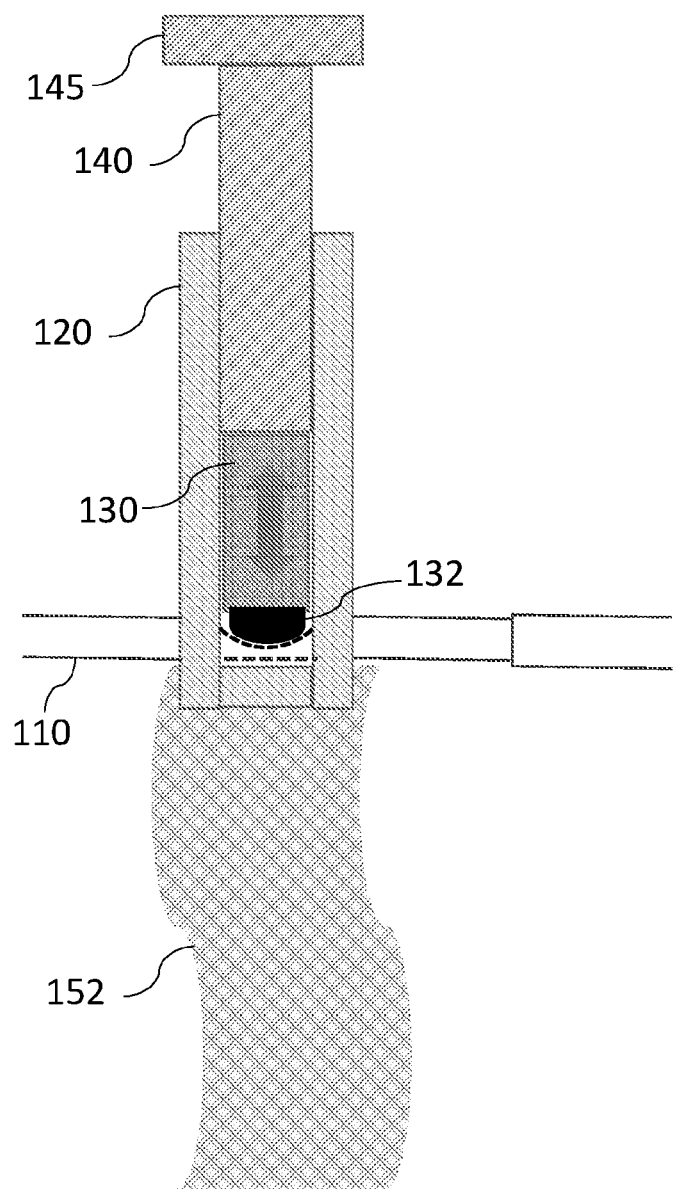

FIG. 3A-3C show autonomous irrigation system 100 in a side view and a cross-sectional lengthwise view, according to certain embodiments. Autonomous irrigation system 100 comprises flexible tube 110 passing through opposite walls of housing 120. Housing 120 further comprises a bias screw 140, which may be configured to adjust the desired maximum water flow rate in flexible tube 110 by applying a continuous compressive force onto swellable element 130 shown in FIGS. 3B and 3C, which in turn applies a compressive force on flexible tube 110, thereby constricting the flow of water therethrough. Bias screw 140 may comprise a knob or handle 145 to ease manipulation of bias screw 140. Bias screw 140 may be engaged within housing 120 through internal screw threads in opening 123 shown in FIG. 2.

Referring to FIG. 3B, autonomous irrigation system may comprise a swellable element 130 configured to swell when absorbing moisture. In certain embodiments, swellable element 130 may be composed of bentonite or another like material having desired hydrophilic and solvating properties. Optionally, swellable element 130 is cylindrically-shaped and has a diameter enabling swellable element 130 to fit within housing 120, e.g., a diameter within a range of 8 mm to 10 mm. Swellable element 130 may be inserted into the hollow space defined by housing 120 through opening 123 and enclosed within housing 120 by bias screw 140, or another form of lid or seal. Such a closure by be fastened by screwing, snaps, magnets or any like method of sealing in the swellable element such that it can only expand in the direction of flexible tube 110. Swellable element 130 may be arranged adjacent to flexible tube 110, such that when swellable element 130 swells it applies a compressive force onto flexible tube 110.

Swellable element 130 may be coupled to a rigid element 132, which may be configured to communicate the compressive force applied by swellable element 130 to the flexible tube 110. It will be appreciated that swellable element 130 may lack sufficient rigidity for effectively applying a compressive force to the flexible tube 110 without causing some deformation of swellable element 130 itself. Rigid element 132 may be coupled to swellable element 130 between swellable element 130 and flexible tube 110, such that when swellable element 130 swells, swellable element 130 pushes rigid element 132 against flexible tube 110, thus applying the full compressive force to flexible tube 110. Rigid element 132 may define, e.g., a cylinder or a hemisphere having a diameter equal to the diameter of the swellable element 130 on the side adjacent to the swellable element, such the any deformation of the swellable element 130 in minimized. In some embodiments, rigid element 132 comprises two hemispheres pushing with their curved surfaces against the flexible tune 110 from opposite sides. The first of said hemispheres is coupled at its flat surface to the swellable element 130, and the second of said hemispheres is disposed between the closed end of housing 120 and the flexible tube 110. Rigid element 132 may be made of an acrylic polymer, e.g. methacrylate, poly (methyl methacrylate), methyl acrylate, ethyl acrylate, or the like. Rigid element 132 may be of any shape such that it applies the force of the expansion of swellable element 130 to flexible tube 110. Rigid element 132 may have a flat surface that engages or contacts swellable element 130. The flat surface may completely cover or partially cover swellable element 130. Rigid element 132 may be curved or come to a point (like a triangle) where it contacts and applied force to flexible tube 110.

Referring now to FIG. 3C, showing swellable element 130 in a swollen state and compressing flexible tube 110. Housing 120 and bias screw 140 are configured to cause the swellable element 130 to direct its compressive force toward the flexible tube 110. When swellable element 130 absorbs moisture and becomes fully saturated, swellable element 130 applies a compressive force to flexible tube 110 which restricts or completely stops water flow through flexible tube 110, by pinching it partially or fully shut. Constriction of flexible tube 110 by swellable element 130 decreases the amount of water supplied to soil environment 175 or the irrigation plate 180 by the autonomous irrigation system 100. Over time, the moisture in soil environment 175 decreases due to water absorption by the plant via roots 172 or evaporation into the atmosphere. Swellable element 130 may be exposed to air via exposure windows 135, 136 which may cause water to egress from swellable element 130, e.g., due to dehydration. Without additional moisture in the soil environment, the rate of moisture egression from swellable element 130 may be higher than moisture absorption, which may cause swellable element 130 to shrink. As swellable element 130 shrinks, the compressive force on flexible tube 110 reduces, thereby enabling water flow through flexible tube 110 once again.

Figure 4A:
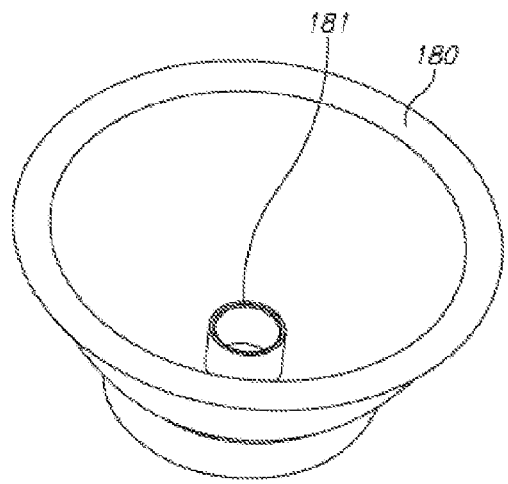
FIGS. 4A-4B show an irrigation plate, according to certain embodiments.
Figure 4B:
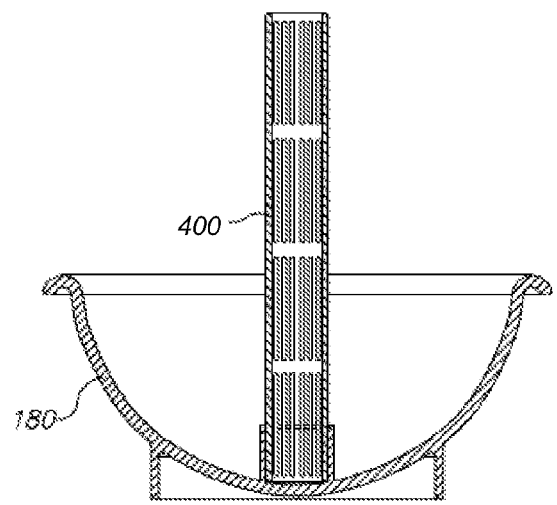

FIG. 4A-4B show irrigation plate 180, according to certain embodiments. Optionally, irrigation plate 180 is in a cube shape, a rectangular cuboid shape, a cylindrical shape, a hemispheric shape, or the like. In certain embodiments, where irrigation plate 180 is a cylinder, irrigation plate 180 may have a diameter within a range of 50-200 cm, which may provide an optimal surface area for water absorption by soil environment 175. Irrigation plate 180 may comprise a depth within a range of 10-500 mm for storing water and to prevent water spillage when water is received from flexible tube 110. Irrigation plate 180 may comprise a connector 181, configured to couple to moisture transfer adapter 152. In some embodiments, the irrigation plate is part of a plant potter, or a pot containing a plant. In some embodiments, the irrigation plate is the bottom of the pot. In some embodiments, the bottom of the pot does not comprise a hole for releasing water, or if there is a hole the hole has been stoppered.

Figure 5:
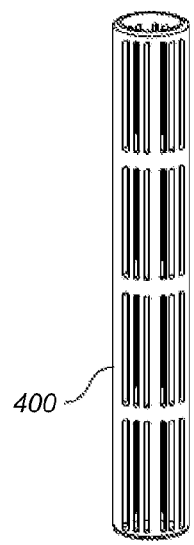
FIG. 5 shows a moisture transfer adapter filter, according to certain embodiments.

Referring to FIGS. 4B and 5, showing filter 400 configured to be coupled to moisture transfer adapter 152. Filter 400 may be composed of polyethylene that is used to receive moisture transfer adapter 152 and prevent deviation of moisture transfer adapter 152 from connecting between irrigation plate 180 and swellable element 130. In certain embodiments, moisture transfer adapter 152 may be connected as a screw on attachment to connector 181. In certain embodiments, moisture transfer adapter 152 may be connected to connector 181 by insertion into connector 181. Filter 400 may be comprised of polymers or plastics or any material that ensure proper connection between the adapter and the plate.

Figure 6:
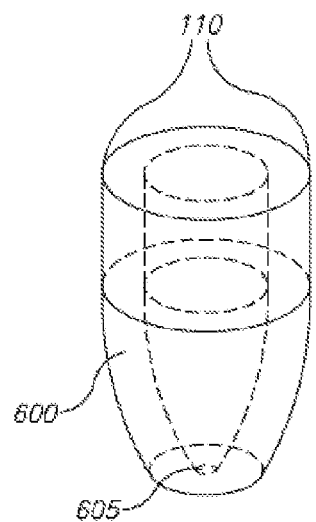
FIG. 6 shows a flexible irrigation tube comprising a check valve, according to certain embodiments.

Referring to FIG. 6, showing a portion of flexible tube 110 comprising a check valve 600, according to certain embodiments. Check valve 600 may be coupled to an irrigation end of flexible tube 110, e.g., the end which provides the water to soil environment 175 and/or irrigation plate 180. Check valve 600 may be configured to enable water to flow out of flexible tube 110 while preventing soil and debris from entering flexible tube 110 resulting in clogs and malfunctioning of autonomous irrigation system 100. In certain embodiments, check valve 600 may be made of silicone or the like. In certain embodiments, check valve 600 may comprise an opening 605. In certain embodiments, opening 605 comprises flexible lips to enable egression of water and prevent entrance of animals and debris into check valve 600. Optionally, check valve 600 may be a diaphragm check valve, a swing check valve, a duckbill valve, or the like.

Figure 7:
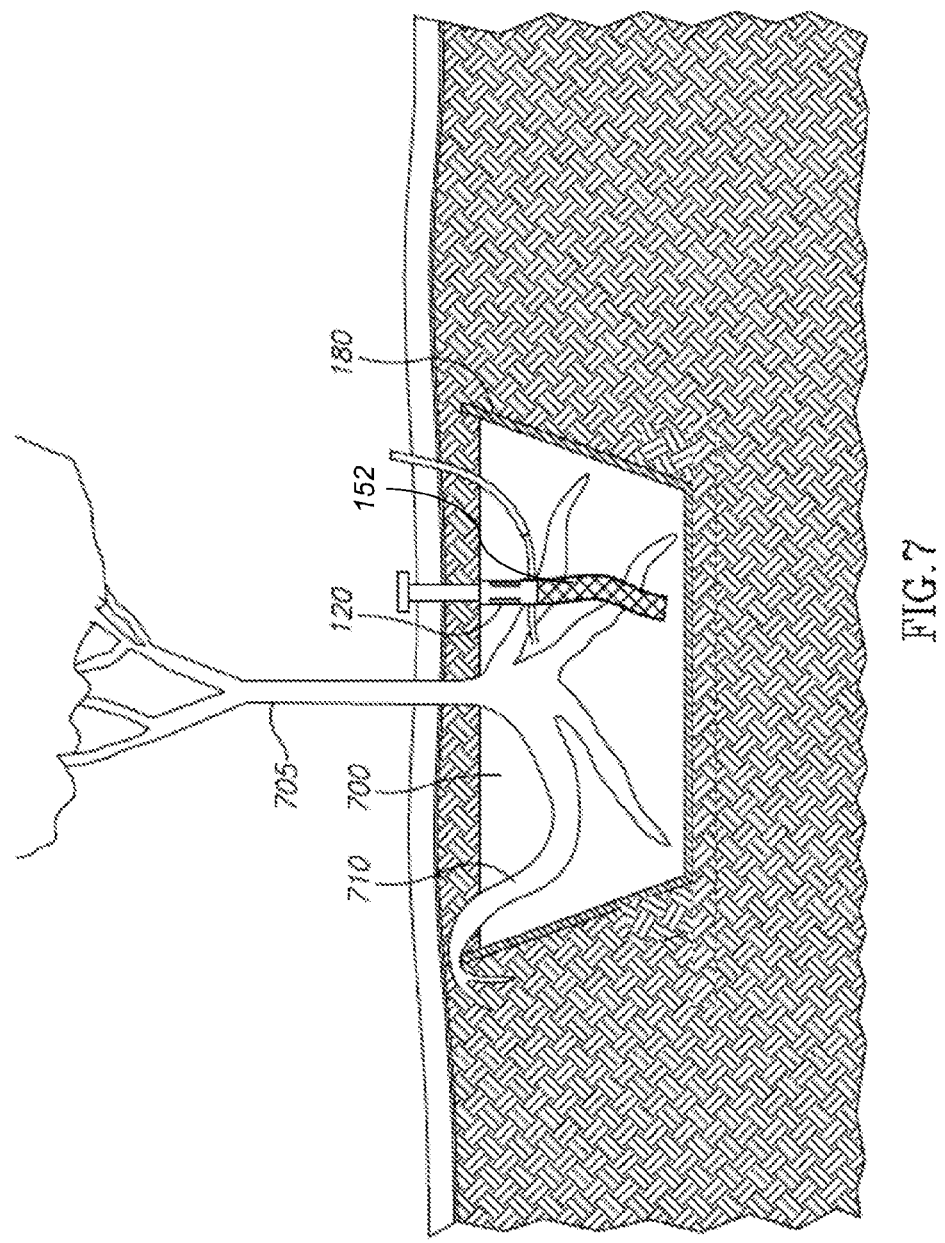
FIG. 7 shows an autonomous irrigation system configured to irrigate a field plant, according to certain embodiments.

FIG. 7 shows autonomous irrigation system 100 configured to irrigate a field plant 700, according to certain embodiments. In certain embodiments, autonomous irrigation system 100 may be configured to irrigate a field plant 705 in a field. In certain embodiments, irrigation plate 180 may be located beneath field plant 705. As a result of osmotic transference, water from irrigation plate 180 may be absorbed by field soil environment 700 vertically above irrigation plate 180. As additional moisture is absorbed by field soil environment 700, the water saturation of the soil increases, forcing moisture to rise vertically through the field soil environment 700 towards a surface of field soil environment 700. Moisture transfer adapter 152 may be disposed such that it communicates moisture from the vicinity of irrigation plate 180 to the autonomous irrigation system 100. Housing 120 may be embedded in field soil environment 700 sufficiently close to field plant 705, such that the swellable element housed within housing 120 swells in reaction to moisture levels at irrigation plate 180 communicated through moisture transfer adapter 152, as well as moisture levels at the field soil environment 700 near roots 710. Optionally, only adapter 152 may contact the swellable element such that the swellable element swells only in response to moisture from the adapter.

Parts of the adapter may be covered in a non-absorbent or non-permeable material such that moisture cannot enter the adapter in these covered regions. In some embodiments, the entire adapter except its distal end (relative to the swellable element) is covered. In some embodiments, at least 10, 20, 30, 40, 50, 60, 70, 80, 90 or 95% of the adapter is covered. Each possibility represents a separate embodiment of the invention. In some embodiments, at most 10, 20, 30, 40, 50, 60, 70, 80, 90 or 95% of the adapter is covered. Each possibility represents a separate embodiment of the invention. In some embodiments, between 10-90, 20-90, 30-90, 40-90, 50-90, 60-90, 70-90, 10-80, 20-80, 30-80, 40-80, 50-80, 60-80, 70-80, 10-70, 20-70, 30-70, 40-70, 50-70, 60-70, 10-50, 20-50, 30-50, 40-50, 10-40, 20-40, 30-40, 10-30, 20-30, or 10-20% of the adapter is covered. Each possibility represents a separate embodiment of the invention. In some embodiments, at least 1, 2, 3, 4, 5, 6, 7, 8, 9, 10, 15, 20, or 25 cm of the adapter is covered. Each possibility represents a separate embodiment of the invention. In some embodiments, at most 1, 2, 3, 4, 5, 6, 7, 8, 9, 10, 15, 20, or 25 cm of the adapter is covered. Each possibility represents a separate embodiment of the invention. In some embodiments, between 1-20, 1-15, 1-10, 1-7, 1-5, 1-3, 3-20, 3-15, 3-10, 3-7, 3-5, 5-20, 5-15, 5-10, 5-7, 7-20, 7-15, 7-10, 10-20 or 10-15 cm of the adapter are covered. Each possibility represents a separate embodiment of the invention. A skilled artisan will appreciate that the adapter can transfer water from anywhere, or everywhere along its length, and that by covering certain regions the source of the moisture swelling the swellable element can be controlled. In some embodiments, only the most distal region and the region at the swellable element are uncovered. In some embodiments, only the most distal end is uncovered. In some embodiments, only the region at the irrigation plate of the end of the plant's roots are uncovered.

Figure 8:
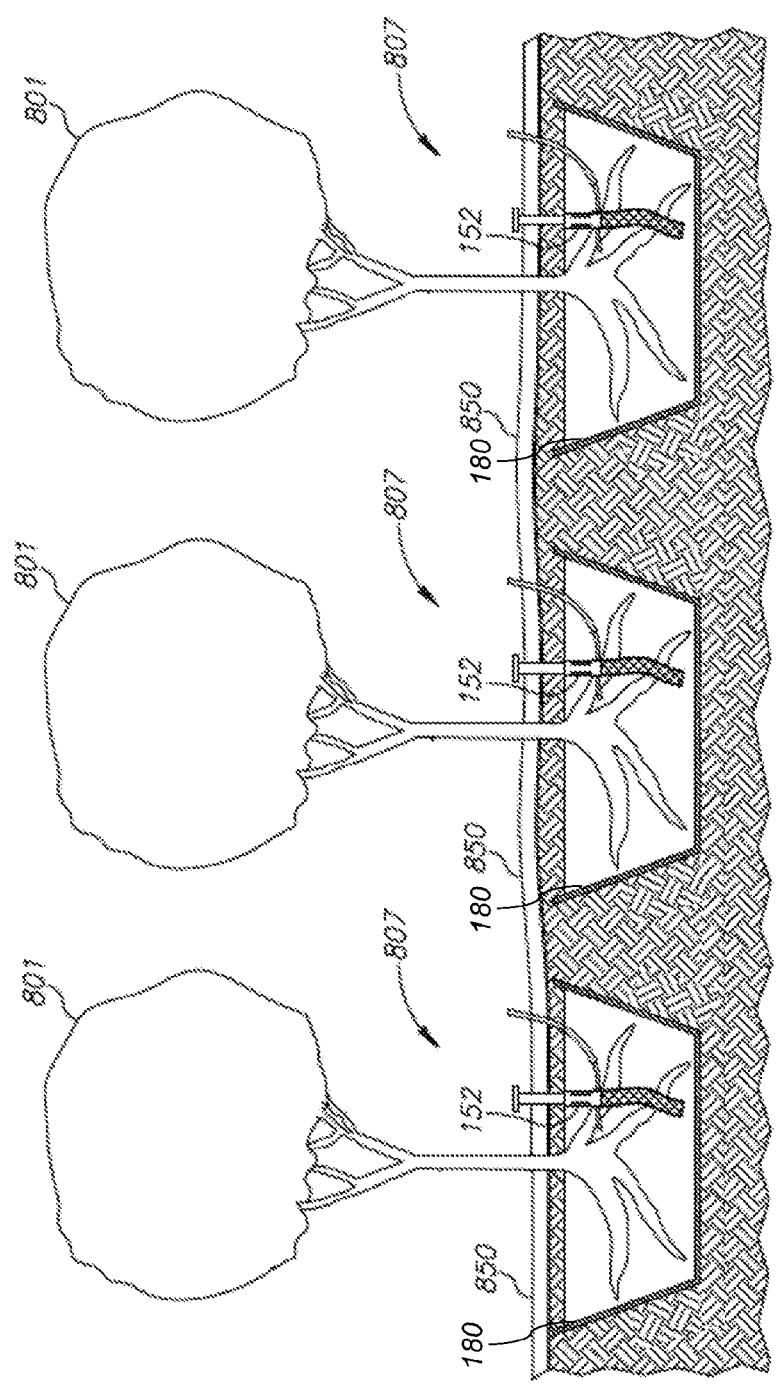
FIG. 8 shows a plurality of autonomous irrigation system configured to irrigate a plurality of plants, according to certain embodiments.

FIG. 8 shows a plurality of autonomous irrigation systems 807 configured to irrigate a plurality of plants 801, according to certain embodiments. For irrigation of multiple plants, each of plants 801 is planted above a respective irrigation plate 180. Plants 801 are each provided an autonomous irrigation system 807 connected to a lead tube 850. Lead tube 850 may be configured as a main water source for the multiple plants. In certain embodiments, the multiple plants may be distinct types of plants, where each plant requires a different volume of water for survival and growth. autonomous irrigation systems 807 each comprise a swellable element (not shown), which regulates water rations for the respective plant 801. Since each of plants 801 may require a different amount of water due to factors such as type of plant, rate of growth, relative humidity, rate of air flow, type of soil in which plant is embedded, and/or the like, water rations for each of plants 801 may be different.

Figure 9:
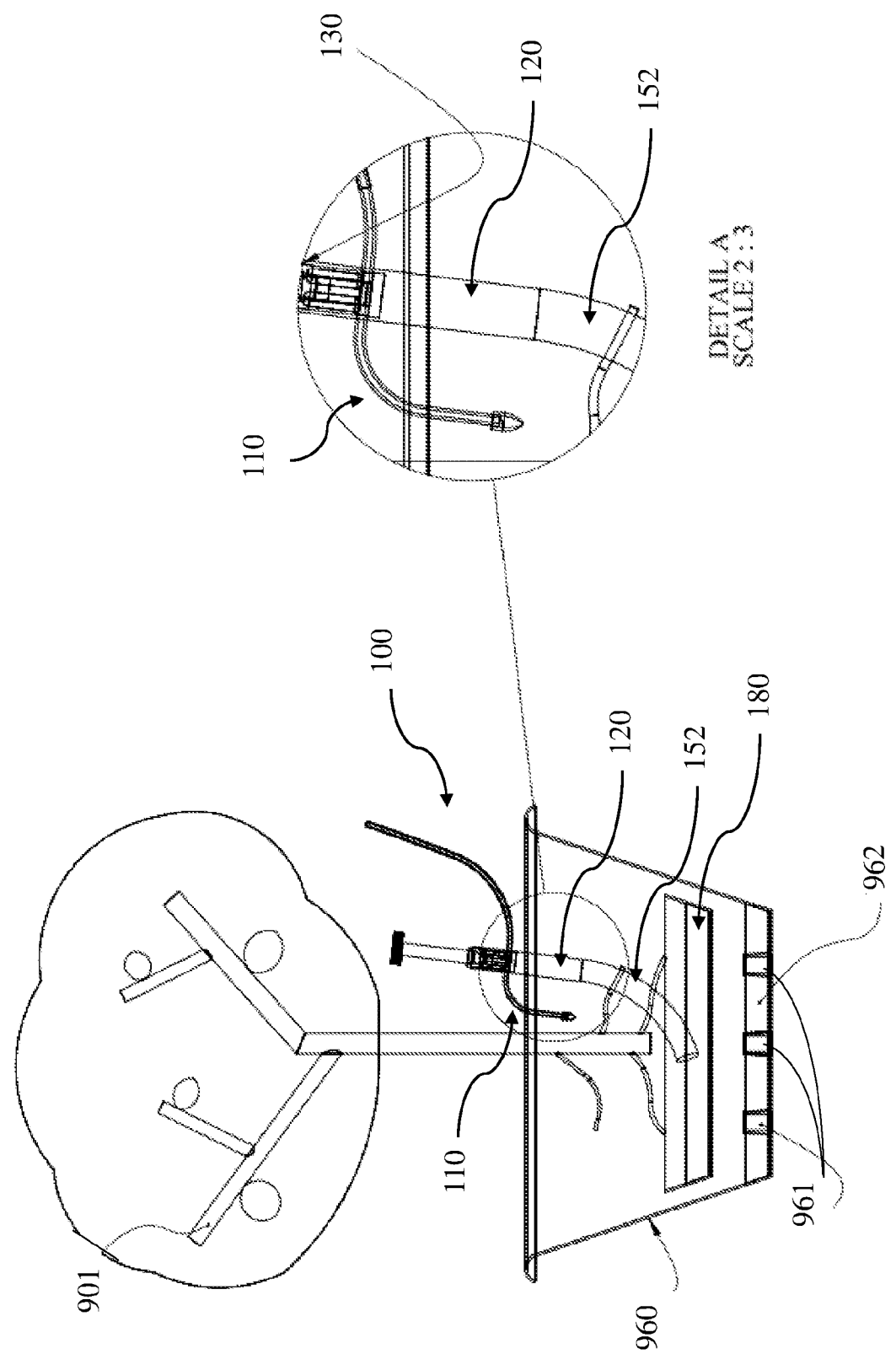
FIG. 9 shows an autonomous irrigation system configured to irrigate a plant in a pot, according to certain embodiments, a blown-up view is inset.

As shown in FIG. 9, the plant to be irrigated need not be in a field, but rather may be growing anywhere, including but not limited to, a pot, a garden, a house, a planting bed, and a green house. Any growing plant may be irrigated with the systems and methods of the invention. In some embodiments, the plant to be irrigated is in a pot. In some embodiments, the plant to be irrigated is in a garden. In some embodiments, the plant to be irrigated is in a house. In some embodiments, the plant to be irrigated is not a tree. In some embodiments, the plant to be irrigated is a flower. In some embodiments, the plant to be irrigated is a bush.

FIG. 9 shows that device 100 may be partially inserted into a growth medium (soil), such that swellable element 130, and optionally windows or other access points to the swellable element are above ground. The lower portion of housing 120 is within the growth medium and anchors device 100 in position so it does not move away from plant 901. Flexible tube 110 passes from housing 120 into the growth medium where it can release water. Moisture transfer adapter 152 extends further into the growth medium and down to irrigation plate 180. Plant 901 and device 100 are shown within pot 960 which comprises drainage holes 961 in bottom 962. Optionally, if bottom 962 does not comprise a hole, then bottom 962 may itself be the irrigation plate and no separate irrigation plate may be necessary. Alternatively, as many plant pots have holes, if drainage holes 961 become filled, either by plant roots or a stopper, then bottom 962 may itself be the irrigation plate and no separate irrigation plate may be necessary. A stopper may be made of any material that closes the whole. Possible materials include rubber, wood, ceramic, plastic, paper or metal. The stopper need not be completely water tight, as so long as water cannot easily drain from the hole the bottom of the vessel holding the plant may suffice as an irrigation plate.

Figure 10:
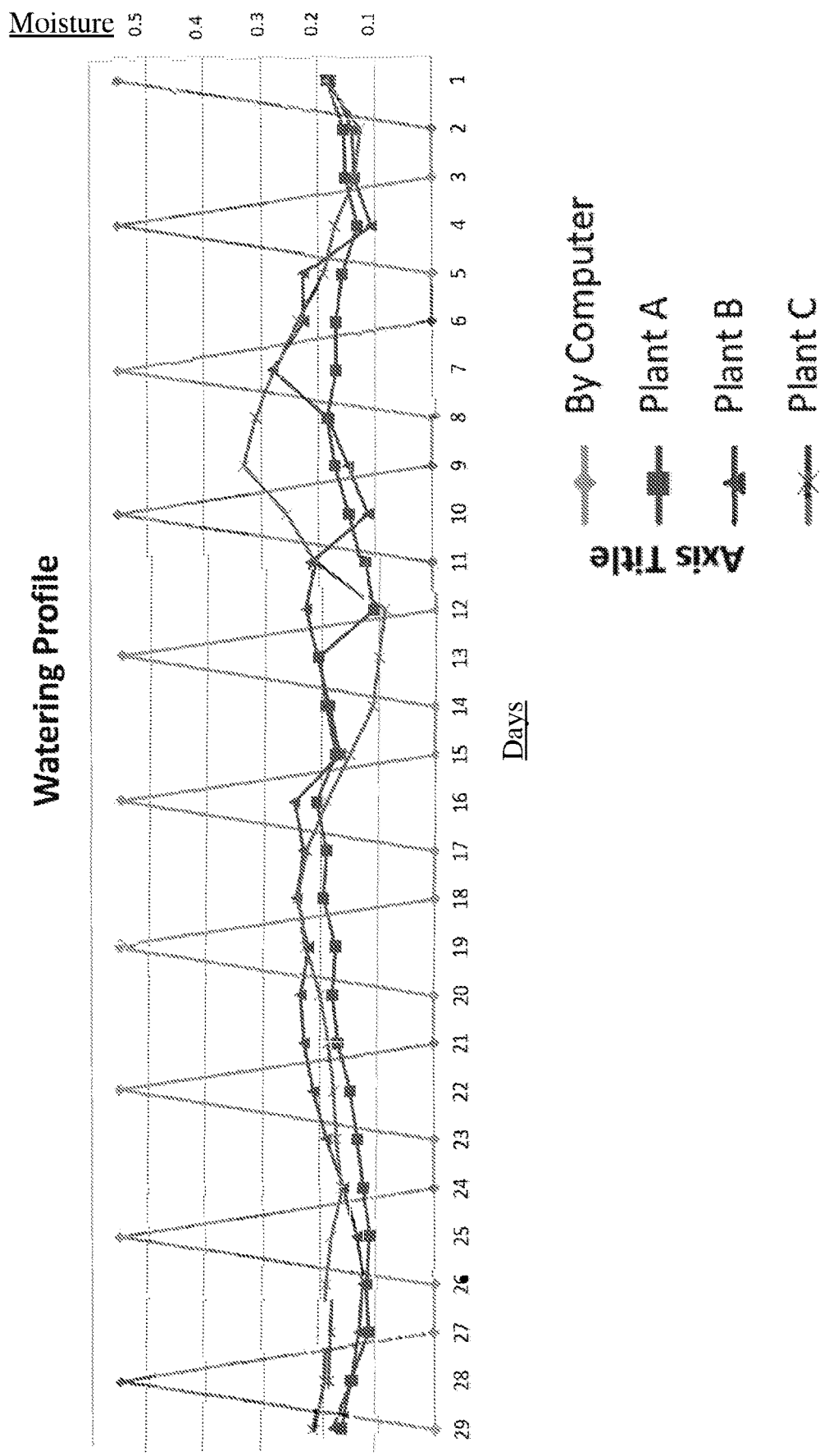
FIG. 10 shows a water profile of moisture at the roots of three plants grown using autonomous irrigation systems and one plant watered by a computer every 3 days.

FIG. 10 shows a watering profile of moisture levels at the roots of 4 separately grown plants. 3 of the plants (A, B and C) where irrigated using 3 devices of the invention all attached to the same water source, while a fourth plant was irrigated by a computer that watered every third day. Plants A, B and C all had different watering requirements. As can be seen in FIG. 10, though they each required different amounts of water, use of the device of the invention kept the moisture level at the plants roots at a constant level. This insured that the plants were never to dry and never to wet. By contrast, the computer automated watering resulted in very high moisture levels on the day of watering, that rapidly reduced to nothing by the day before watering. A plant so watered would be too dry on some days but drowned on others. Further, much of the water from the computerized watering is wasted as the plant cannot absorb all of it. These problems would be exasperated during rain or periods of extreme heat when the overwatering and underwatering, respectively, would be even worse. This exemplifies the extreme advantage of the present invention, as a gardener or farmer can use the device of the invention with little to no oversight and be ensured that diverse plants are all being watered appropriately.

In some embodiments, a first plant to be irrigated and a second plant to be irrigated require different amounts of moisture, or uptake moisture at different rates and are irrigated by a first and second system of the invention respectively, wherein the first and second systems receive water from the same source. In some embodiments, more than two plants are irrigated by more than two systems of the invention respectively, wherein all systems receive water from the same source. In some embodiments, the system of the invention produces an essentially constant moisture level at the roots of a plant. In some embodiments, the essentially constant moisture level comprises a variance of not more than 5, 10, 15, 20, 25, 30, 35, 40, 45 or 50%. Each possibility represents a separate embodiment of the invention.

In some embodiments, there is provided a method comprising providing a system of the invention, at least partially embedding the housing of the system in a soil environment at a predetermined depth adjacent to a plant, configuring the flexible tube to deliver water to a region of the soil environment below the plant, configuring a location of the moisture transfer adapter so as to provide moisture communication from the region of soil environment below the to the swellable element, and flowing water through the flexible tube.

In some embodiments, the housing is completely embedded in the soil environment. In some embodiments, the housing is partially embedded in the soil environment. In some embodiments, partial embedding comprises at least, 1, 2, 3, 4, 5, 6, 7, 8, 9, or 10 cm of the housing embedded in the soil environment. Each possibility represents a separate embodiment of the invention. In some embodiments, the housing is partially embedded such that the swellable element contacts the air. In some embodiments, the housing is partially embedded such that moisture can is removed from the swellable element by evaporation. In some embodiments, partial embedding comprises contact between the swellable element and the air.

In some embodiments, the region of soil environment below the plant is at least 3, 5, 7, 9, 10, 12, 15, 17, or 20 cm from the swellable element. Each possibility represents a separate embodiment of the invention. In some embodiments, the region of soil environment below the plant is not proximal to the swellable element. In some embodiments, the outlet end of the tube is no proximal to the swellable element. In some embodiments, the irrigation plate is not proximal to the swellable element.

In some embodiments, the method further comprises placing an irrigation plate in the region of the soil environment below the plant. In some embodiments, the irrigation plate is embedded in the soil environment. In some embodiments, the irrigation plate is the bottom of a container holding the plant. In some embodiments, irrigation plate is placed such that the flexible tube can deliver water to the irrigation plate. In some embodiments, the system is connected to a water source, such as a faucet. In some embodiments, the flexible tube is connected at one end to the water source and the other end is positioned to deliver water to the region of soil environment under the plant. In some embodiments, the adapter provides moisture communication from the irrigation plate to the swellable element.

In some embodiments, egression of moisture from the swellable element reduces a constricting force applied on the flexible tube by the swellable element. In some embodiments, the reduction of the constricting force enables water flow through the flexible tube. In some embodiments, the water flow persists until sufficient water is delivered to the region of soil environment under the plant to cause moisture transfer via the adapter to the swellable element to again swell and close the flexible tube. In this way the system automatically regulates watering of the plant without any sensors or electronics and ensures the roots of the plant are never too wet and never too dry.

A skilled artisan will appreciate that a plant can be killed by both too little watering and too much watering. Too little watering and the plant dies of thirst; too much watering and the plant dies of strangulation as mud does not allow entry of air to the roots. Systems that only detect/measure/respond to moisture near the soils surface will often underestimate the amount of water available to roots. Due to proximity to the soil surface, heat from the sun, and evaporation by the air can produce soil with low moisture levels even when deeper soil is still wet. Further, water absorption by the plant can lower moisture levels at higher soil levels, while the roots are still well watered. This can lead to over watering if the irrigation system is not responding to moisture levels at the bottom of the roots. The system and method of the invention employs the transfer adapter to make sure that the plant is not killed by over watering, and provides an advantage over other irrigation systems known in the art. Further, because no electronics are used the system can be employed without outlets or the need for batteries or solar panels. Additionally, because the system responds to moisture directly at the plants roots, many systems can be inserted near many different plants with diverse water needs, and still irrigate each plant properly.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples, and these examples found hereinbelow should be considered as embodiments of the present invention.

Various embodiments and aspects of the present invention as delineated hereinabove and as claimed in the claims section below find experimental support in the following examples.

EXAMPLES

The following examples are meant to illustrate, but in no way to limit, the claimed invention. The following examples represent embodiments of the claimed invention.

Example 1

A Static Model of Humidity Transfer from the Soil to the Capillary Pipeline (Moisture Transfer Adapter) and Progress Through the Pipeline The irrigation system operates essentially by the following process:
Humidity transferring from the soil to the capillary pipeline (moisture transfer adapter);
Capillary progress of the humidity in the pipeline (adapter);
Spreading of the blocking unit (swellable element);
Pressure of the blocking unit on the water tube (flexible tube);
Water tube's opening and closing as a result of the pressure from swelling.

We can use Fick's law for estimation of the diffusion of the water from the soil to our capillary pipeline:

$$\frac{dC}{dt} = D \cdot \frac{d^2C}{dx^2} - \alpha \quad \text{(Eq. \#1)}$$

when C is the concentration of water vapors, D is the diffusion coefficient and a is the absorption rate per volume unit.

In steady state, we can say:

$$\frac{d^2C}{dx^2} = \frac{\alpha}{D}. \quad \text{(Eq. \#2)}$$

We can use this equation to characterize a) the humidity of the soil (and its changes as a function of the depth), b) the humidity transfer between the soil and the pipeline and c) the humidity inside the pipeline (if it's a material and not a tube).

Capillary motion in a thin tube is given by Jurin's law:

$$h = \frac{2 \cdot \gamma \cdot \cos(\theta)}{r \cdot \rho \cdot g} \quad \text{(Eq. \#3)}$$

when h is the liquid height in the tube, $\gamma$ is the surface tension, $\theta$ is the contact angle of the liquid on the tube's wall, r is the tube radius, $\rho$ is the liquid density and g is the gravity acceleration. Both the surface tension and the contact angle depend on the liquid and the tube's materials.

In a further expansion of Jurin's law, the dominant forces in capillary motion are the interfacial tension and gravity, when Jurin's law describes equilibrium between both for a hollow pipe. The capillary pressure equations are given by the interfacial tension pressure:

$$p_c = \frac{2 \cdot \gamma \cdot \cos(\theta)}{r} \quad \text{(Eq. \#4)}$$

and the gravity pressure:

$$p_c = h \cdot (\rho_{wet} - \rho_{dry}) \quad \text{(Eq. \#5)}.$$

Example 2

Spreading of the Blocking Unit and its Pressure on the Water Tube

While dealing with hydrothermal properties of composite materials the following equation is employed:

$$\varepsilon_z = \frac{\sigma_z}{E_{zz}} - \frac{\sigma_x}{n_{xz}} - \frac{\sigma_y}{n_{yz}} + \alpha \cdot \Delta T + \beta \cdot \Delta C \quad \text{(Eq. \#6)}$$

when $\varepsilon$ is the strain (normalized elongation $\Delta L/L$), $\sigma$ is the stress, E is Young's modulus (modulus of elasticity), n is Poison's ratio, $\alpha$ is the thermal coefficient and $\beta$ is the humidity strain coefficient.

The blocking unit is closed inside the tube so $\varepsilon_x = \varepsilon_y = 0$ (no elongation because it's bounded). From this boundary condition we can assume:

$$\varepsilon_x = \frac{\sigma_x}{E_{xx}} - \frac{\sigma_z}{n_{xz}} - \frac{\sigma_y}{n_{xy}} + \alpha \cdot \Delta T + \beta \cdot \Delta C = 0. \quad \text{(Eq. \#7)}$$

If there are no outer stresses, we get:

$$\sigma_x = -E_{xx}(\alpha \cdot \Delta T + \beta \cdot \Delta C) \quad \text{(Eq. \#8)},$$

and similarly:

$$\sigma_y = -E_{yy}(\alpha \cdot \Delta T + \beta \cdot \Delta C) \quad \text{(Eq. \#9)},$$

and for the Z axis, when the material is isotropic ($E_{xx} = E_{yy} = E_{zz}$):

$$\varepsilon_z = (1 + 2 \cdot n) \cdot (\alpha \cdot \Delta T + \beta \cdot \Delta C) \quad \text{(Eq. \#10)}.$$

The water pipe will press the blocking unit such that:

$$\varepsilon_z = (1 + 2 \cdot n) \cdot (\alpha \cdot \Delta T + \beta \cdot \Delta C) - \frac{P}{E} \quad \text{(Eq. \#11)}$$

when P is the pipe's pressure on the blocking unit. The block elongation is $$\Delta Z = \varepsilon_z \cdot Z_0 \quad \text{(Eq. \#12)}$$

when $Z_0$ is the initial blocking height.

Thus, the deformation of the pipeline is given by:

$$\Delta Z = \frac{P_{length}}{\frac{10 \cdot E \cdot I}{r^3}} \quad \text{(Eq. #13)}$$

when P is the outer pressure per unit of length and $EI/r^3$ is the stiffness of the pipe.

The vector of the pressure is on a length of the block's diameter therefore:

$$\Delta Z = \frac{P \cdot D_{block}}{\frac{10 \cdot E \cdot I}{r^3}} \quad \text{(Eq. #14)}$$

An expression for the stiffness can be given as:

$$\frac{E \cdot I}{r^3} = \frac{2E}{3(DR-1)^3} \quad \text{(Eq. #12)}$$

when DR is the dimension ratio and is given as D/t when D is the pipe diameter and t is its wall thickness. We can see that this stiffness is not a function of the pipe's size (just its proportions). The same pressure will cause the same vertical displacement, but its effect on blocking the water depends on the pipe's size.

For equilibrium between the blocking unit elongation and the pipe deformation we will have to fulfill:

$$\Delta Z = \frac{P \cdot D_{block}}{\frac{20 \cdot E_{pipe}}{3(DR_{pipe}-1)^3}} = \quad \text{(Eq. #13)}$$

$$L_0 \cdot \left((1 + 2n_{block}) \cdot (\alpha \cdot \Delta T + \beta \cdot \Delta C)_{block} - \frac{P}{E_{block}}\right)$$

when P is the pressure which resists the block elongation. This equation includes the elasticity of the water pipe and the water pressure inside it:

$$P = P_{water} + P_{pipe} \quad \text{(Eq. #14)}.$$

From this we can get the expression for the pressure:

$$P_{pipe} = \frac{L_0 \cdot ((1 + 2 \cdot n_{block}) \cdot (\alpha \cdot \Delta T + \beta \cdot \Delta C)_{block})}{\frac{L_0}{E_{block}} + \frac{3(DR_{pipe}-1)^3 \cdot D_{block}}{20 \cdot E_{pipe}}}, \quad \text{(Eq. #15)}$$

and we can get $\Delta Z$. For a full closure of the pipe it is required that $\Delta Z > D_{pipe}$. For smaller value, we get a non-linear valve, however, for initial approximation we will assume linearity:

$$Q = Q_{max} \cdot \left(1 - \frac{\Delta Z}{D}\right). \quad \text{(Eq. #16)}$$

Example 3

Numeric Example of Blocking Unit Closing the Water Tube

In the following example the minimum soil humidity at the end of the adapter pipeline necessary to close the water tube is calculated. Based on a given length of the capillary pipeline, and given properties of the pipeline, tube and blocking unit it was determined that a soil humidity of at least 62% in the lower edge of the capillary pipeline will enable capillary motion to the height of the blocking unit which will in turn absorb the water and close the water pipe.

Assuming a pipe with an outer diameter of 3 mm and width of 1 mm, and Young's modulus of 10 MPa, then:

$DR_{pipe}=3$ and $E_{pipe}10*10^6$ Pa.

Assuming a blocking unit with a length of 20 mm, diameter of 5.5 mm, humidity strain coefficient of 0.4 (while 100% humidity of the block's strain is 40% on all axes, so its final volume is 270% of its initial one), Young's modulus of 20 MPa, and Poison's ratio of 0.5, then: $D_{block}=0.0055$ m, $L_0=0.02$ m, $E_{block}=20*10^6$ Pa, and $n_{block}=0.5$. For a humidity of 0.35 in the blocking unit and water pressure of $2*10^5$ Pa (2 atmospheres) we get elastic pressure of about 3.4 MPa and displacement of 2 mm which ensures closing the pipe (the required displacement is between 1-2 mm).

The capillary tube covers the blocking unit, so if water gets to the unit's height, the blocking unit will absorb the required water and block the water pipe. The capillary motion is in a porous absorbent structure. The pressure caused by the interfacial tension is thus given by:

$$p_c = \frac{2 \cdot \gamma \cdot \cos(\theta)}{r} \quad \text{(Eq. #17)}$$

when: $\gamma$ is the surface tension of the water: $70*10^{-3}$ N/m (typical, with little change due to temperature), r is limited by the tube's radius: 0.003 m, and $\theta$ is the contact angle between the water and the pipe's walls.

The gravity pressure is given by:

$$p_c = h \cdot (\rho_{wet} - \rho_{dry}) \quad \text{(Eq. #18)}$$

when: h is the capillary tube's height: 0.2 m, $\rho_{dry}$ is the density of the capillary tube when it's dry: 538 kg/m³, and $\rho_{wet}$ is the density of the capillary tube when it's fully absorbed: 1216 kg/m³. We can see that the pressure which is caused by the interfacial pressure will reach this value if the effective radius is about 1 mm. This example assumes that the tube is vertical. When the tube is configured on a diagonal, the pressure caused by gravity is reduced which enables longer distances to be traversed (although horizontal motion is also required).

In this example we can see that these dimensions and properties enable capillary motion, but we are interested in the humidity that causes opening and closing of the water pipe. The capillary pressure equations provide the humidity gradient in the capillary tube. If for this example and say that the effective tube radius is 0.5 mm and the contact angle is 40°, we get that the pressure caused by the interfacial tension is $$p_c = \frac{2 \cdot \gamma \cdot \cos(\theta)}{r} = \frac{2 \cdot 70 \cdot 10^{-3} \cdot \cos(40°)}{0.5 \cdot 10^{-3}} = 214.5 \text{ Pa}$$

This pressure enables capillary motion to a height of:

$$h = \frac{p_c}{(\rho_{wet} - \rho_{dry})} = \frac{214.5}{(1216 - 538)} = 0.32 \text{ m}$$

That means that the humidity gradient in the capillary tube is 100%/0.32 m. The capillary pipeline length, as stated, is 0.2 m; so, for humidity of at least 62% at the bottom of the pipeline capillary motion will reach the blocking unit and keep it wet. We refer to effective tube radius because, in this example, we use a porous structure and not a hollow tube. Capillary motion is much more effective while using porous structures because the motion is through narrow spaces, and the interface pressure becomes bigger.

Now, we have to check the humidity transfer between the soil and the capillary tube:

$$\frac{d^2 C}{dx^2} = \frac{\alpha}{D} \quad \text{(Eq. \#19)}$$

when C is the concentration of water vapors, D is the diffusion coefficient and a is the absorption rate per volume unit. The gradient in the tube intersection can be neglected because of the geometrical proportions. That means, that in steady state, the condition for closing is a humidity of at least 62% in the bottom of the capillary pipeline.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system, comprising:
    a housing comprising an elongated hollow body configured to be at least partially embedded in a soil environment at a desired depth, adjacent to a plant;
    a swellable element housed within said housing completely above ground, said swellable element being configured to swell when absorbing moisture;
    a resiliently-compressible flexible tube configured to provide water to the soil environment, said flexible tube passing transversely through tube openings of the housing, said flexible tube is disposed adjacent to the swellable element inside the housing such that a swelling or displacement of said swellable element compresses the flexible tube, thereby limiting or preventing water flow therethrough; and
    a moisture transfer adapter configured to communicate moisture along its length from a desired location within the soil environment to the swellable element,
    wherein said desired location is other than the immediate soil environment vicinity of said housing,
    wherein said housing comprises exposure windows configured to provide air and water communication between the swellable element and the ambient air outside the housing, and
    wherein the moisture transfer adapter comprises a sleeve configured to wrap around a portion of the exterior of the housing comprising at least a portion of said exposure windows.

2. The system of claim 1, further comprising an irrigation plate disposed underneath the roots of the plant within the soil environment, said irrigation plate being configured to receive and retain water from the flexible tube and irrigate the soil environment.

3. The system of claim 2, wherein said desired location is said irrigation plate.

4. The system of claim 2, wherein said irrigation plate comprises a connector for stably attaching said moisture transfer adapter thereto.

5. The system of claim 2, further comprising a filter defining a perforated elongated tubular body configured for receiving the moisture transfer adapter therein and connecting to said irrigation plate.

6. The system of claim 2, wherein said irrigation plate is a bottom portion of a container configured to contain the plant to be irrigated.

7. The system of claim 1, further comprising a regulating element comprising a screw configured to rotatably engage with interior screw threads at an open end of the housing, said regulating element being disposed within the housing such that by rotating the regulating element, the swellable element is displaced towards the flexible tube such that it applies an initial compressive force on the flexible tube.

8. The system of claim 1, wherein the flexible tube comprises a catch valve configured to prevent debris in the soil environment from penetrating the flexible tube.

9. The system of claim 1, wherein the moisture transfer adapter is made of a fibrous or a porous material.

10. The system of claim 1, further comprising a rigid element coupled to the swellable element and configured to communicate compressive pressure from the swellable element to the flexible tube upon swelling or displacement of the swellable element.

11. The system of claim 1, further comprising a non-water permeable adapter cover positioned to block transfer of moisture to at least a portion of said moisture transfer adapter.

12. The system of claim 1, wherein said system does not comprise an electronic component.

13. A method comprising:
    providing the system according to claim 1;
    at least partially embedding said housing in the soil environment at the desired depth adjacent to the plant;
    configuring said flexible tube to deliver water to a region of said soil environment below said plant;
    configuring a location of said moisture transfer adapter so as to provide moisture communication from said region of said soil environment below said plant to said swellable element, wherein said location is other than the immediate soil environment vicinity of said housing; and
    flowing water through said flexible tube.

14. The method of claim 13, further comprising placing an irrigation plate in said region of said soil environment below said plant such that said flexible tube delivers water to said irrigation plate and said moisture transfer adapter provides moisture communication from said irrigation plate to said swellable element.

15. The method of claim 13, wherein egression of moisture from the swellable element reduces a compressive force applied on the flexible tube by the swellable element.

16. The method of claim 13, wherein said moisture transfer adapter is configured to communicate moisture from said region of said soil environment below said plant to said swellable element at at least the same rate as moisture is transferred through the soil environment.

17. The method of claim 13, wherein said region of said soil environment below said plant is located at a distance of at least 10 cm from said swellable element.

\* \* \* \* \*